United States Patent [19]
Chandra et al.

[11] Patent Number: 6,091,724
[45] Date of Patent: Jul. 18, 2000

[54] ROUTING MESSAGES WITHIN A NETWORK USING THE DATA CONTENT OF THE MESSAGE

[75] Inventors: Tushar Deepak Chandra, Elmsford, N.Y.; Robert Evan Strom, Ridgefield, Conn.; Daniel Charles Sturman, Croton-on-Hudson, N.Y.

[73] Assignee: International Business Machines Corporation, Amonk, N.Y.

[21] Appl. No.: 08/975,303

[22] Filed: Nov. 20, 1997

[51] Int. Cl.⁷ .................................................. H04L 12/54
[52] U.S. Cl. ........................ 370/390; 370/400; 370/256
[58] Field of Search ................................. 370/400, 401, 370/389, 351, 390, 256

[56] References Cited

U.S. PATENT DOCUMENTS

| | | | |
|---|---|---|---|
| 5,257,369 | 10/1993 | Skeen et al. | 395/650 |
| 5,325,362 | 6/1994 | Aziz | 370/94.3 |
| 5,517,562 | 5/1996 | McConnell | 379/207 |
| 5,522,046 | 5/1996 | McMillen et al. | 395/200.15 |
| 5,555,244 | 9/1996 | Gupta et al. | 370/60.1 |
| 5,557,798 | 9/1996 | Skeen et al. | 395/650 |
| 5,570,366 | 10/1996 | Baker et al. | 370/85.13 |
| 5,581,764 | 12/1996 | Fitzgerald et al. | 395/703 |
| 5,604,867 | 2/1997 | Harwood | 395/200.13 |
| 5,870,605 | 2/1999 | Bracho et al. | 395/682 |

OTHER PUBLICATIONS

Smirnov, M.I., "Object–Oriented Framework for a Scalable Multicast Call Modelling", Teleservices and Multimedia Communications Second International COST 237 Workshop, Proceedings, Springer–Verlag, vii+277, pp. 1–39 (1996).

Hofmann, M., "A Generic Concept for Large–Scale Multicast", Broadband Communications, Network, Services, Applications, Future Directions, International Zurich Seminar on Digital Communications, IZS '96, Proceedings, Springer–Verlag, xiv+358, pp. 95–106 (1996).

Zabele et al., "High Performance Infrastructure For Visually–Intensive CSCW Applications", Transcending Boundaries, CSCW '94, Proceedings of the Conference on Computer Supported Cooperative Work, ACM, xi+464, pp. 395–403 (Oct. 1994) (Abstract Only).

Lorenzo Aguilar, "Datagram Routing for Internet Multicasting," ACM Computer Commuications Review, 14(2), 1984, pp. 58–63.

D. Scott Alexander et al., "The SwitchWare Active Network Architecture," IEE Network Special Issue on Active and Controllable Networks, May/Jun. 1998, vol. 12, No. 3 pp. 29–36.

Uyless Black, TCP/IP & Related Protocols, Second Edition. McGraw–Hill, 1995, pp. 122–126.

Antonio Carzaniga, "Architectures for an Event Notification Service Scalable to Wide–area Networks". Available from http://www.cs.colorado.edu/users/carzaniga/siena/index.html.

Stephen E. Deering, "Multicast Routing in InterNetworks and Extended LANs," ACM Computer Communications Review, 18(4), 1988, pp. 55–64.

John Gough and Glenn Smith, "Efficient Recognition of Events in a Distributed System," Proceedings of ACSC–18, Adelaide, Australia, 1995.

Bill Segall and David Arnold, "Elvin has left the building: A publish/subscribe notification service with quenching," Proceedings of AUUG97, Brisbane, Australia, Sep. 1997. Available from http://www.dstc.edu.au/Elvin/papers/AUUG97//AUUG97.html.

(List continued on next page.)

*Primary Examiner*—Joseph L. Felber
*Attorney, Agent, or Firm*—Heslin & Rothenberb, P.C.; Wayen L. Ellenboge, Esq.

[57] ABSTRACT

A router within a network uses the data of a message received at the router to determine on which links out of the router the message needs to be forwarded. The router does not need any destination information from the message, and thus, the message need not include any destination information. Instead, the router uses an annotated search data structure to determine which links correspond to consumers interested in receiving the message. The message is sent only over those links.

32 Claims, 9 Drawing Sheets

OTHER PUBLICATIONS

R. Sharma, S. Keshav, M. Wu and L. Wu. "Environments for Active Networks," Proceedings of the IEEE 7th International Workshop on Network and Operating System Support for Digital Audio and Visual, 1997, pp. 77–84.

Tony Speakman, Dino Farinacci, Steven Lin and Alex Tweedly. "PGM Reliable Transport Protocol," IETF Internet Draft, Aug. 24, 1998.

D. Tennenhouse, J. Smith, W.D. Sincoskie, D. Wetherall, G. Minden. "A Survey of Active Network Research," IEEE Communications Magazine. Jan., 1997, vol. 35, No. 1, pp. 80–86.

Hanson et al., "A Predicate Matching Algorithm for Database Rule Systems", Published at Proceedings of SIGMOD, pp. 271–280 (1991).

Mishra et al., "Consul: A Communication Substrate for Fault–Tolerant Distributed Programs", TR91–32, Department of Computer Science, The University of Arizona, pp. 1–33 (Nov. 1991).

Birman, Kenneth P., "The Process Group Approach to Reliable Distributed Computing", Communication of the ACM, vol. 36, No. 12, pp. 37–53 (Dec. 1993).

Oki et al., "The Information Bus—An Architecture for Extensible Distributed Systems", SIGOPS '93, ACM 0–89791–632–8/93/0012, pp. 58–68 (1993).

Grossglauser, M., "Optimal Deterministic Timeouts for Reliable Scalable Multicast", Proceedings IEEE Comput. Soc. Press, xxvi+1487, pp. 1425–1432 (1996).

Powell, David, "Group Communication", Communications of the ACM, vol. 39, No. 4, pp. 52–100 (Apr. 1996).

Smirnov, M.I., "Efficient Multicast Routing In High Speed Networks", Computer Communications, vol. 19, No. 1, Elsevier, pp. 59–75 (Jan. 1996).

Cormen, Thomas H., Leiserson, Charles E. and Rivest, Ronald L., *Introduction to Algorithms*, Chapter 24, "Minimum Spanning Trees," pp. 498–513, McGraw–Hill Book Company (1990).

Internet World Wide Web Site Section entitled "TIB/Rendezvous White Paper," located at Web Site http://www.rv.tibco.com/rvwhitepaper.html, printed pp. 1–16, (1994–1997).

Internet World Wide Web Site Section entitled "Intranet/Internet," located at Web Site http://www.tibco.com/products/internet.html, printed p. 1 of 1, date printed from Internet Apr. 29, 1997, actual date of paper unknown.

Internet World Wide Web Site Section entitled "TIBnet Overview," located at Web Site http://www.tibco.com/announce/tibwhite.html, printed pp. 1–5, date printed from Internet Apr. 29, 1997, actual date of paper unknown.

Internet World Wide Web Site Section entitled "NEONet Product Overview," located at Web Site http://www.neonsoft.com/prods/neonover.html, printed pp. 1–18, date printed from Internet Oct. 20, 1997, actual date of paper unknown.

Skeen, Dale Ph.D. and Vitria Technology, Inc. "Velociti The Enterprise–Capable Publish–Subscribe Server," located at Internet World Wide Web Site http://www.vitria.com/whitepapers/velocitiwp.html, printed pp. 1–17, date printed from Internet Jan. 14, 1998, actual date of paper unknown.

| CLIENT COMPUTER ADDRESS | LINK IDENTIFIER |
|---|---|
| 101a | 3 |
| 101b | 4 |
| 101c | 2 |
| 101d | 1 |
| ⋮ | |
| | |

ROUTING MESSAGES WITHIN A NETWORK USING THE DATA CONTENT OF THE MESSAGE

TECHNICAL FIELD

This invention relates, in general, to multicasting messages within a network and, in particular, to using the data content of the message to determine over which links a message is to be sent, irrespective of any destination information that may be included within the message.

BACKGROUND ART

Many network environments enable messages to be forwarded from one site within the network to one or more other sites using a multicast protocol. Typical multicast protocols send messages from one site to one or more other sites based on information stored within a message header. That is, each message has two components: the message header, which includes the routing information, including destination addresses or a predefined group name that is associated with a fixed list of destinations, and the data content, which is the data of the message. The routing information is read from the message header and is used to send the data content of the message to the specified destinations.

One example of a system that includes such a network environment is a publish/subscribe system. In publish/subscribe systems, publishers post messages and subscribers independently specify categories of events in which they are interested. The system takes the posted messages and includes in each message header the destination information of those subscribers indicating interest in the particular message. The system then uses the destination information in the message to forward the message through the network to the appropriate subscribers.

In large systems, there may be many subscribers interested in a particular message. Thus, a large list of destinations needs to be added to the message header and used in forwarding the message. The use of this list, which can be even longer than the message itself, can degrade system performance.

Other approaches have included the use of multicast groups, in which destinations are statically bound to a group name, and then that name is included in the message header. The message is then sent to all those destinations statically bound to the name. This technique has the disadvantage of requiring static groups of destinations, which restricts flexibility in many publish/subscribe systems.

Thus, a need exists for a routing capability that can route messages without requiring any destination information in the message. A further need exists for a routing capability that does not require the adding of destination information to a message or the predefining of static destination groups.

SUMMARY OF THE INVENTION

The shortcomings of the prior art are overcome and additional advantages are provided through the provision of a method of determining the zero or more links to be used to route a message. The method includes, for example, receiving a message, and determining, based on a data content of the received message, zero or more links over which the message is to be sent. The determination is made irrespective of any destination information that may be within the message.

In one embodiment, the determining includes searching a data structure using the data content of the message to determine the zero or more links. The searching includes, for example, traversing the data structure until a mask provides an indication of the zero or more links.

In one instance, the mask includes a plurality of values, the positions of which correspond to a plurality of links. The indication indicates zero links when the plurality of values includes a plurality of first predefined values, and one or more links when one or more of the plurality of values includes a second predefined value.

In one embodiment, the traversing of the data structure includes comparing the mask to a vector associated with a node of the data structure; refining the mask when the comparing indicates refinement; proceeding to another node of the data structure, when the mask is to be further refined; and repeating the comparing, refining and proceeding until the mask needs no further refinement.

The refining includes, for instance, updating at least one of a plurality of values in the mask based on at least one value of at least one corresponding position in the vector. The positions of the plurality of values in the mask correspond to a plurality of links of a router that received the message.

In a further embodiment, the updating of the at least one value includes changing at least one value of the mask from a Maybe indication to a Yes indication or a No indication, depending on the value in the corresponding position of the vector.

In a further aspect of the invention, a method of routing messages within a network is provided. The message is received, and the message is routed to a subset of clients of the network. The subset includes less than all of the clients of the network, and the routing is irrespective of any destination information that may be within the message.

In a further aspect of the invention, at least one program storage device readable by a machine, tangibly embodying at least one program of instructions executable by the machine to perform a method of determining zero or more links to be used in routing a message is provided. The method includes receiving the message; and determining, based on a data content of the message, zero or more links over which the message is to be sent. The determination is irrespective of any destination information that may be within the message.

In another aspect of the invention, at least one program storage device readable by a machine, tangibly embodying at least one program of instructions executable by the machine to perform a method of routing messages within a network is provided. The method includes receiving a message; and routing the message to a subset of clients of the network. The subset includes less than all of the clients of the network, and the routing is irrespective of any destination information that may be within the message.

In yet another aspect of the invention, an article of manufacture is provided. The article of manufacture includes at least one computer usable medium having computer readable program code means embodied therein for causing the determining of zero or more links to be used in routing a message. The computer readable program code means in the article of manufacture includes computer readable program code means for causing a computer to receive a message; and computer readable program code means for causing a computer to determine, based on a data content of the message, zero or more links over which the message is to be sent. The determination is irrespective of any destination information that may be within the message.

In a further aspect of the invention, an article of manufacture, including at least one computer usable medium having computer readable program code means embodied therein for causing the routing of messages within a network, is provided. The computer readable program code means in the article of manufacture includes computer readable program code means for causing a computer to receive a message; and computer readable program code means for causing a computer to route the message to a subset of clients of the network. The subset includes less than all of the clients of the network, and the routing is irrespective of any destination information that may be within the message.

In yet another aspect of the invention, a system of determining zero or more links to be used in routing a message is provided. The system includes a router being adapted to receive a message and being further adapted to determine, based on the data content of the message, zero or more links over which the message is to be sent. The determining is irrespective of any destination information that may be within the message.

In yet a further aspect of the invention, a system of routing messages within a network is provided. The system includes means for receiving a message, and means for routing the message to a subset of clients of the network. The subset includes less than all of the clients of the network and the routing is irrespective of any destination information that may be within the message.

The routing capability of the present invention advantageously eliminates the need for adding destination information to a message. Further, the routing capability of the present invention does not use any destination information that may be included in a message to route the message. Instead, it uses the data content of the message to determine over which links the message is to be sent.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a routing capability is provided in which messages are routed in a network based on the content of the data within the message. The message does not need to include destination information, such as destination addresses or a group destination name. Instead, data within the message is used to traverse a data structure to determine the link or links over which the message is to be forwarded in order to reach the consumers (subscribers or clients) interested in the message.

Figure 1:
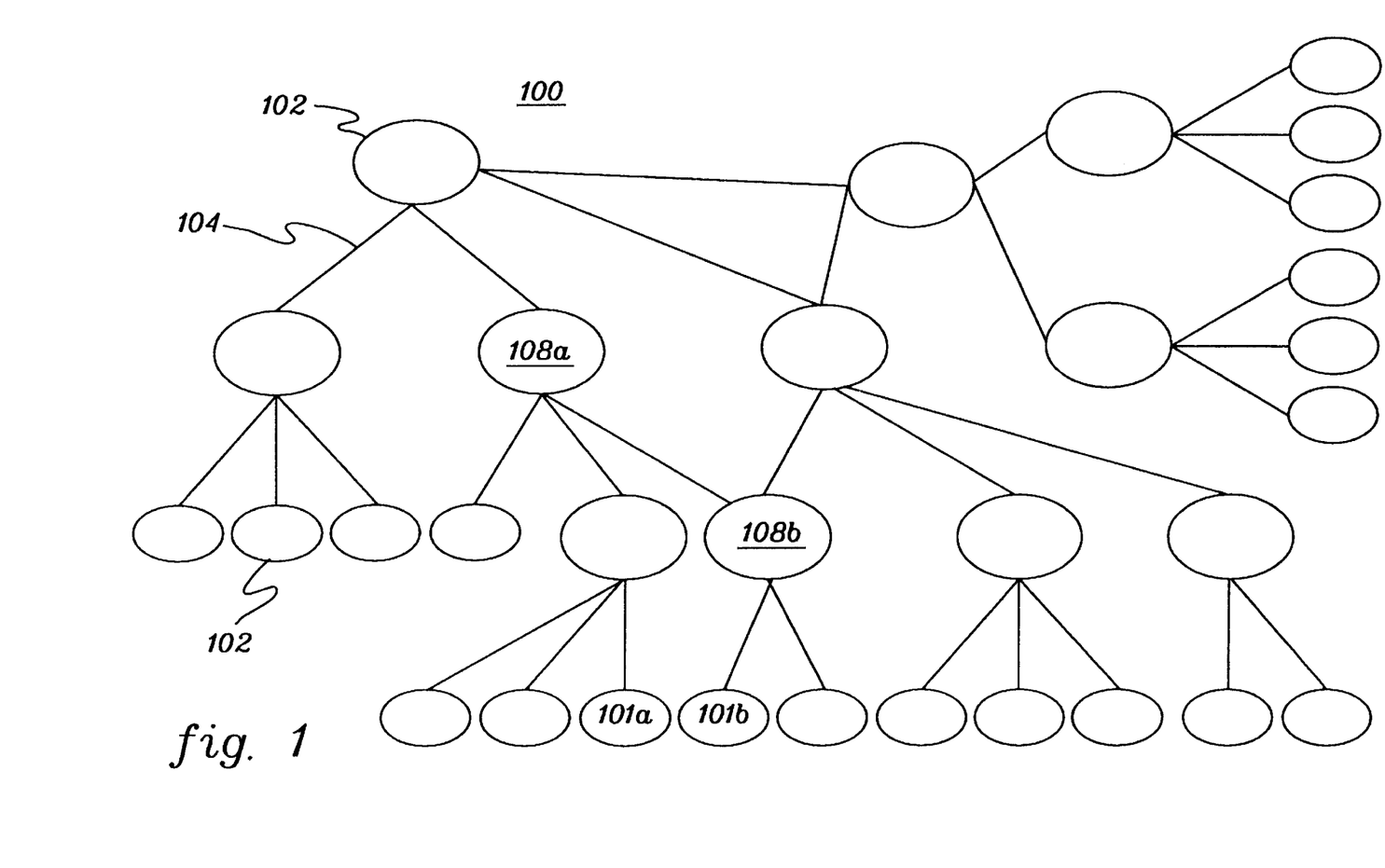
FIG. 1 depicts one example of a distributed network incorporating and using the routing capability of the present invention.

One example of a distributed network 100 incorporating and using the routing capability of the present invention is depicted in FIG. 1 and described in detail herein. Network 100 includes, for instance, a plurality of computing units 102 coupled to one another by links 104.

Each link couples two computing units in the network, and each computing unit may have any number of links connected to it. Each link is bidirectional, i.e., a computing unit may send and receive messages on the link. Each computing unit in the network is either a client computer (represented by the smaller ovals, such as those having addresses 101a, 101b), meaning that it has requested to receive messages whose content satisfies certain properties; or it is a router computer (represented by the larger ovals, such as 108a, 108b), meaning that it forwards messages received on one network link onto other links on the way to the client computer(s). The clients are collectively referred to herein as clients 101 and the routers are collectively referred to as routers 108. (For purposes of this discussion, if a single computing unit serves both as a router and as a client, these two separate functions will be considered as two computing units connected by a link.)

Each computing unit can be any type of computing unit that can be included in a network. For example, it can be an RS/6000 computing node or any other of various types of computing nodes, processors, computers or systems. The network can also include different types of computing units coupled to one another via the links. The links include, for instance, TCP connections over T1 links, as only one example.

Distributed network 100 can be included in various systems that require the passing of messages or data. These systems include, for instance, the internet or a content-based publish/subscribe system.

Content-based publish/subscribe systems improve the degree of decoupling between publishers and subscribers. In content-based publish/subscribe systems, subscriptions are specified in terms of predicates on the posted data, rather than in terms of subject identifiers supplied by the publisher. One example of a content-based publish/subscribe system is described in co-pending U.S. patent application Ser. No. 08/975,280, entitled "Method And System For Matching Consumers To Events," Astley et al., filed herewith, which is hereby incorporated herein by reference in its entirety. The examples described herein are with reference to a content-based subscription system. However, these are only examples. The present invention can be employed with other types of systems without departing from the spirit of the present invention.

In one embodiment of the present invention, each router 108 of network 100 (FIG. 1) has associated therewith a spanning tree, which lays out the best path (according to some criterion, such as latency) from the router to each of clients 101. In this embodiment, it is assumed that routers agree on a common criterion for measuring distance between nodes in the network. There may in fact be multiple spanning trees. For example, alternative spanning trees may specify either backup routes, or peak load routes. Herein, it is assumed that one spanning tree is in effect for the routing of any particular message.

Figure 2:
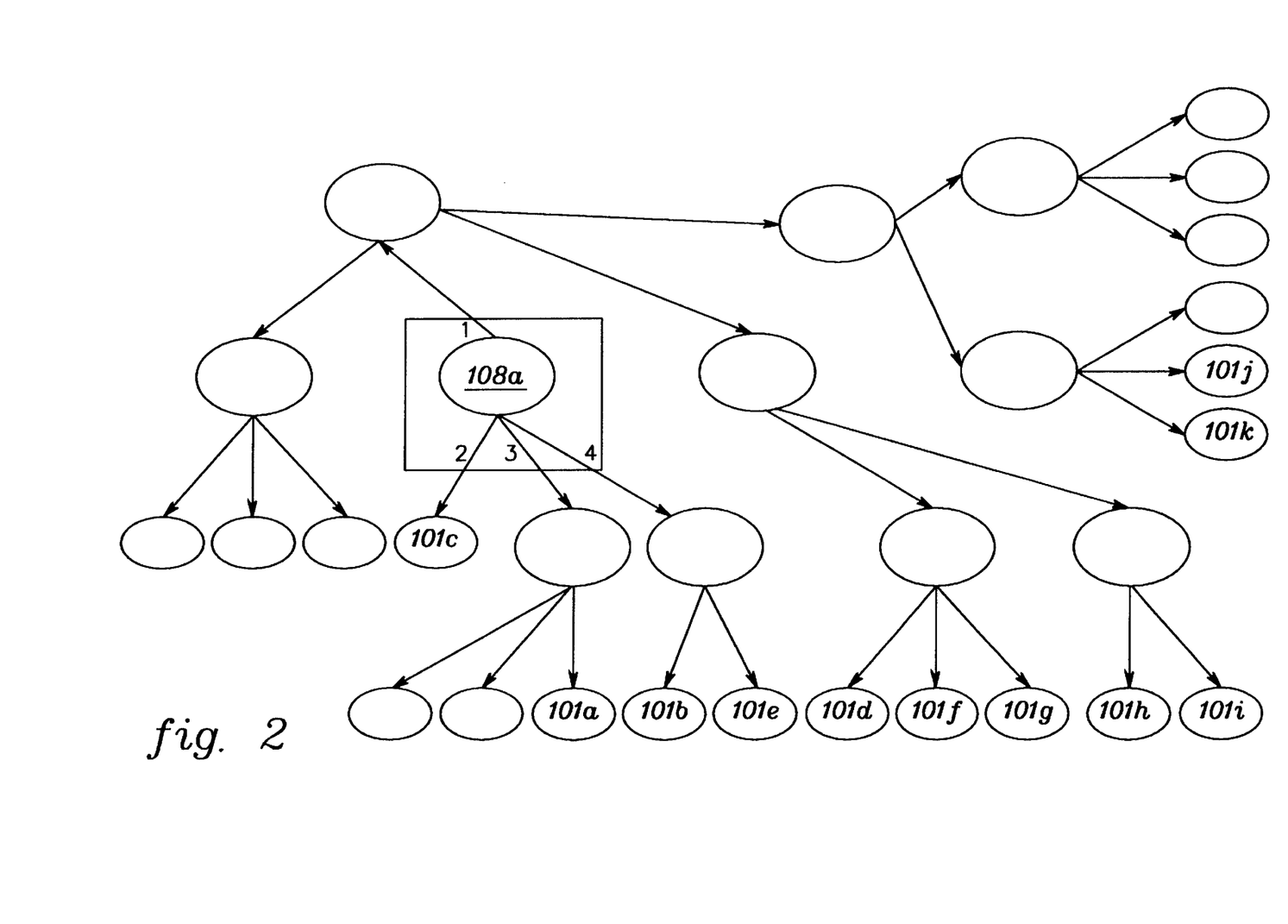
FIG. 2 depicts one example of a spanning tree used in accordance with the principles of the present invention.

One example of a spanning tree, which is associated with router 108a, is depicted in FIG. 2. As shown in FIG. 2, there is a path from router 108a to every other node in the spanning tree. A message to be routed from router 108a to one or more of the other nodes is routed via one or more of the links associated with router 108a, i.e., links 1–4. For example, if a message is to be routed from node 108a to node 101c, then link 2 is used. As a further example, if a message is to be forwarded toward client 101a, then link 3 is used.

One embodiment for building a spanning tree from a network topology, that is an arbitrary graph, is described in detail in *Introduction to Algorithms,* by Cormen, Leiserson, Rivert, Chapter 24, pp 498–513, Published by MIT Press (1990), which is hereby incorporated herein by reference in its entirety.

Figure 3:
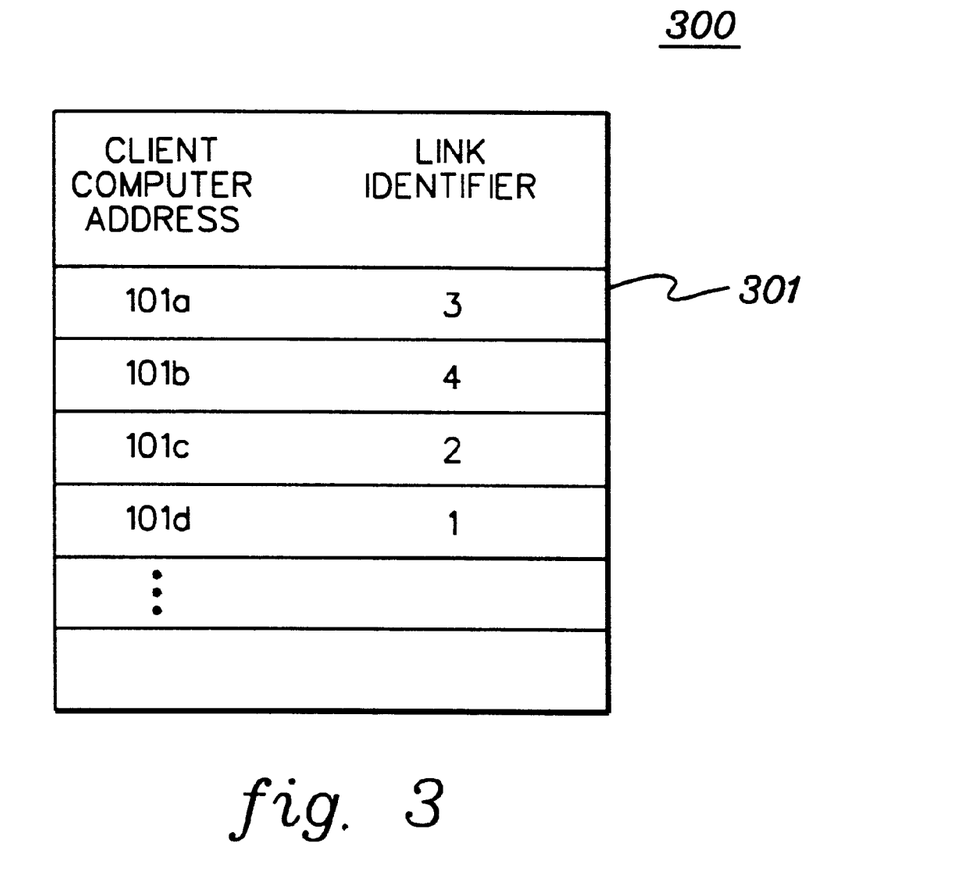
FIG. 3 depicts one example of a routing table used in accordance with the principles of the present invention.

In addition to the spanning tree associated with each router, each router has a routing table. One example of a routing table 300 is depicted in FIG. 3. Routing table 300 includes an entry 301 for each client computer in the network. Each entry 301 of the routing table associates a client address with the identifier of the network link constituting the next segment on the path in the spanning tree from the router to the client. For a router with d network links, each such link identifier is an integer between 1 and d. For instance, the client having address 101a has a corresponding link identifier of 3 (see FIGS. 2 and 3).

Each routing table is constructed via information from the network topology (e.g., the client addresses) and hence from the corresponding spanning tree (e.g., the link identifiers), in a known manner.

Content-based Subscription

In a content-based subscription system, one or more of the clients can specify a subscription. Each subscription provides a set of conditions indicating the types of messages those clients are interested in receiving. Those messages satisfying the conditions are delivered to the client. As an example, the message is defined to be a tuple of K fields containing values, and each subscription is a collection of up to K tests on those fields.

Consider an example in which messages are related to the stock market. In such an example, a subscription may have the following three fields (or attributes): stock issue, stock price and stock value. The client specifies values for these fields, e.g., IBM, 100, 200, and then, these fields are used to determine if the client is interested in a particular message. If the data content of the message matches the specified values of the subscription, then the message is delivered to the one or more subscribers (or clients) of that subscription. It will be apparent to those skilled in the art that the use of three fields in the subscription is only one example. Subscriptions may include any number of desired fields and tests may include relationships other than equality. Further, the stock market scenario is only one example. Messages and subscriptions can be used for any type of data or events.

Figure 4:
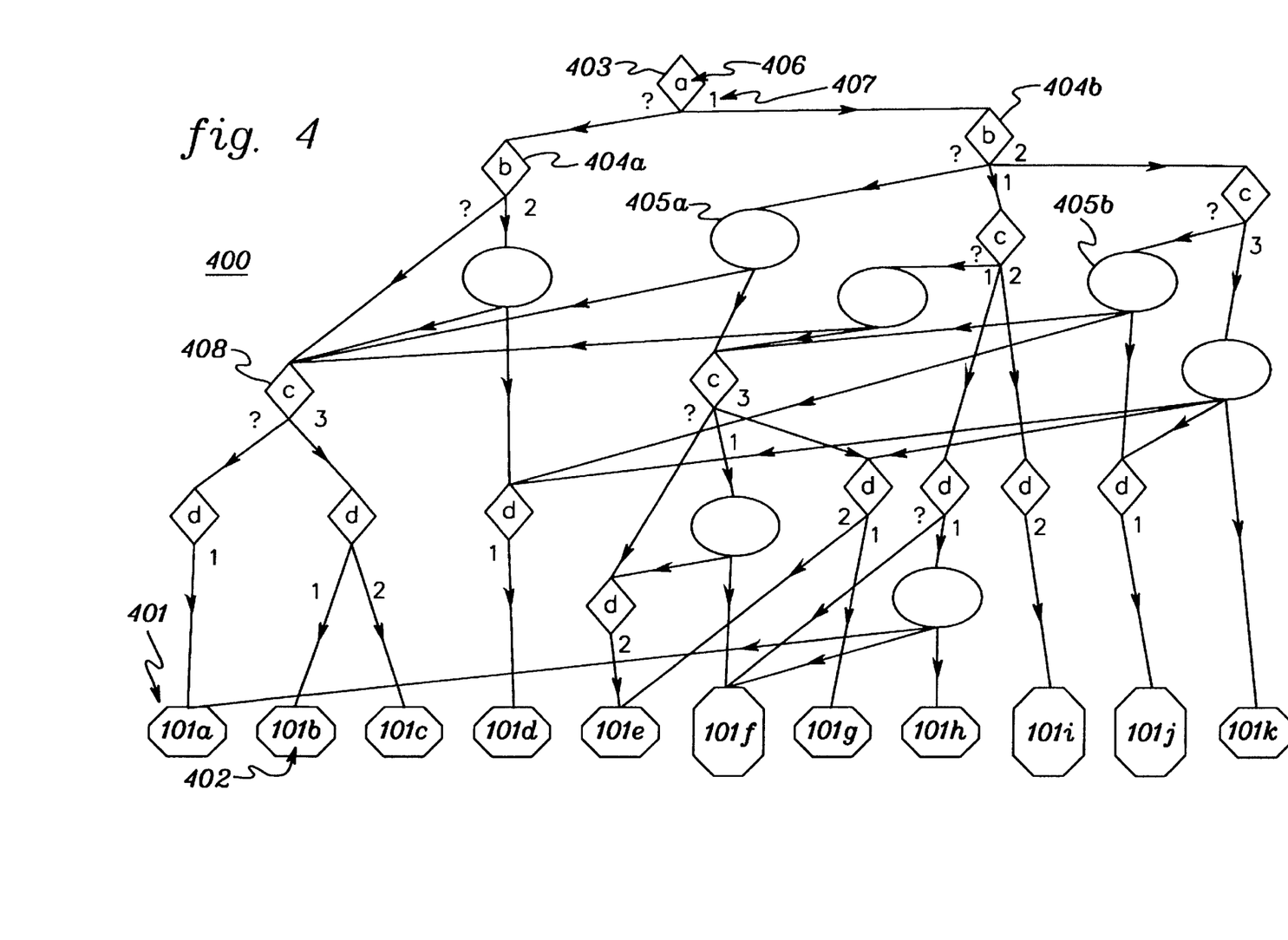
FIG. 4 depicts one embodiment of a search data structure (e.g., a search graph) used in accordance with the principles of the present invention.

Subscriptions provided by clients may be represented in a search data structure, such as a search tree or a search graph. One example of a search graph 400 is depicted in FIG. 4. A search graph is a directed acyclic graph, with a distinguished source node 403, one or more terminal nodes 401 (i.e., the octagonal nodes) and one or more intermediate nodes 408. Each terminal node is labeled with a client address 402. The non-terminal nodes are either test nodes (represented as diamonds, such as 404a, 404b) or parallel search nodes (represented as ovals, such as 405a, 405b). Each test node is labeled with a test 406 to be performed and each out-arc (or segment) from a test node is labeled with one of the mutually exclusive outcomes 407 of the test. There is one out-arc for each possible outcome. Each of the parallel search nodes contains out-arcs (or segments) pointing at either test nodes or terminal nodes. When a parallel search node is reached, all of the out-arcs (or segments) are followed. If a test is reached from an out-arc, then the test is performed. By using a combination of test and parallel search nodes, a large number of search techniques may be incorporated for use by this invention.

The sample search graph depicted in FIG. 4 is a representation of a matching algorithm that calculates, by means of a set of tests and parallel searches for a given message, the set of client computers that are to receive the message. From any test node, including the source node, the calculation proceeds by evaluating the label tests on each out-arc. There will be one test outcome for any test. In FIG. 4, empty terminal nodes are not shown, and therefore, the test outcome may correspond to no visible arc. The single arc labelled with the test outcome is followed to the next node. From any parallel search node, the calculation proceeds by initiating subsearches at the nodes following each out-arc in turn. The message is then sent to all client computers whose terminal nodes are reached by the above search.

The example search graph of FIG. 4 is for a content-based subscription system in which subscriptions and messages contain four fields <a, b, c, d>. Each test node is labeled with the name of the field to be tested. The outcomes of the tests include either concrete values 407, which are the values provided by the clients in their subscriptions, or ? outcomes, which means none of the other outcomes for this test have been satisfied. (The manner in which a ? may result from a subscription is described in detail further below.) To avoid cluttering FIG. 4, whenever a ? outcome leads to a terminal node with an empty set of destinations, the out-arc labeled ? and the empty terminal node are omitted from the diagram. The labels on the terminal nodes in this example correspond to the labels on the client computers from FIG. 2. These are the clients that have specified subscriptions indicating what messages they are interested in receiving.

One embodiment of building a search graph is described in co-pending U.S. patent application Ser. No. 08/975,280, entitled "Method And System For Matching Consumers To Events," Astley et al., filed herewith, which is hereby incorporated herein by reference in its entirety. In the embodiment described in the co-pending application, clients can include don't care values (e.g., a *) in their subscriptions, indicating they do not care about a particular field. For instance, in the stock market example, if a client wants information about all stock issues, it would place a *, as one example, in the first field instead of a concrete value. This indicates that the client wants to receive messages about all stock events regardless of issue. These don't care values are pictorially represented in the search graph of the present invention by using ?s, as described further below.

Figure 6A:
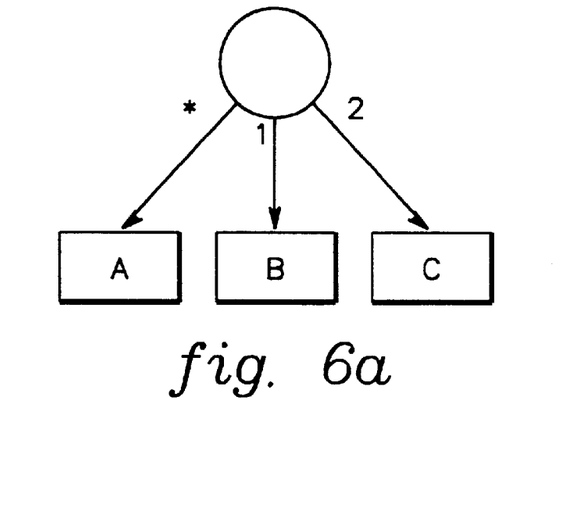
FIG. 6a depicts one example of a search graph, which includes a don't care value.

For instance, the search graph depicted in FIG. 6a, which uses the notational conventions of the co-pending Astley et al. patent application Ser. No. 08/975,280, includes three out-arcs: one labeled *, another labelled 1, and a third labelled 2. This means that if a one field message came in having a value of 1, that the arcs labelled 1 and * would be followed. Arc 1 is followed because it satisfies the test and arc * is followed because it does not care what is in that field. It wants the message. Thus, the two paths are followed to Client A and Client B. The above may be shown in another pictorial representation, which is depicted in FIG. 6b.

Figure 6B:
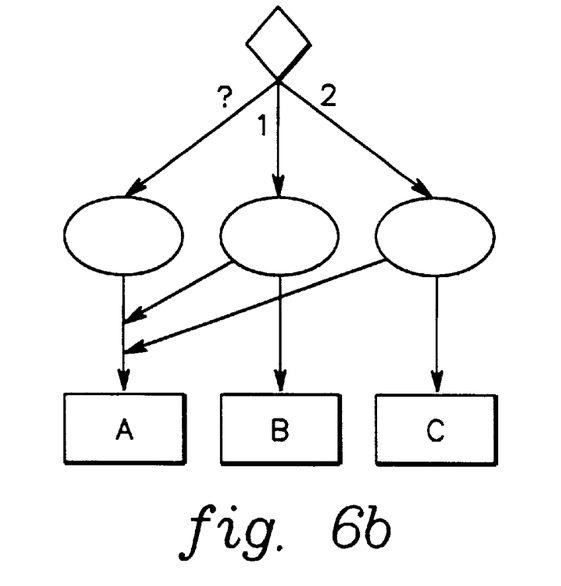
FIG. 6b is another pictorial representation of the search graph of FIG. 6a, in accordance with the principles of the present invention.

The graph of FIG. 6b is an equivalent graph to the one depicted in FIG. 6a, but uses the notational conventions of the present invention. In FIG. 6b, the out-arc labelled 1 leads to a parallel search node, which ultimately leads to Clients A and B. Thus, searches in both graphs would lead to the same result. (The ? in FIG. 6b is only followed when the event being tested yields an outcome other than a 1 or a 2.)

The search graphs and matching techniques described herein and in the co-pending application are only examples. The present invention can be utilized with various types of matching techniques, including other "graph-based" techniques.

Content-based Multicast

In accordance with the principles of the present invention, an annotated search graph for a particular router is produced by that router using the routing table obtained from the network topology for that router and a search graph obtained from a subscription set. The router uses the annotated search graph to determine, for each message arriving at the router, the links over which the message is to be forwarded in order to reach the client computers whose subscriptions match the message.

One embodiment of an annotated search graph is described below with reference to FIG. 5. In one example, the original search graph (e.g., the one depicted in FIG. 4) is modified by storing a vector 520 at each node of the graph. The number of elements in the vector corresponds to the number of links associated with the router for which this graph is being built. That is, a vector with d elements (a d-vector) corresponds to a router with d links. Each element of the d-vector is a trit (3-valued quantity) with a value of Yes (Y), No (N), or Maybe (M). Each position in the vector corresponds to one of the d network links from the given router. Yes at a given position k in the vector at a given node means that any search that reaches the node satisfies the subscription for a client computer reachable via the network link with identifier k; No means that no node reachable from the node satisfies the subscription for any client computer reachable via the link with identifier k; and Maybe means that a search reaching the node has not yet obtained enough information to determine whether or not the event matches any subscriptions for client computers reachable via the link with identifier k.

Figure 7:
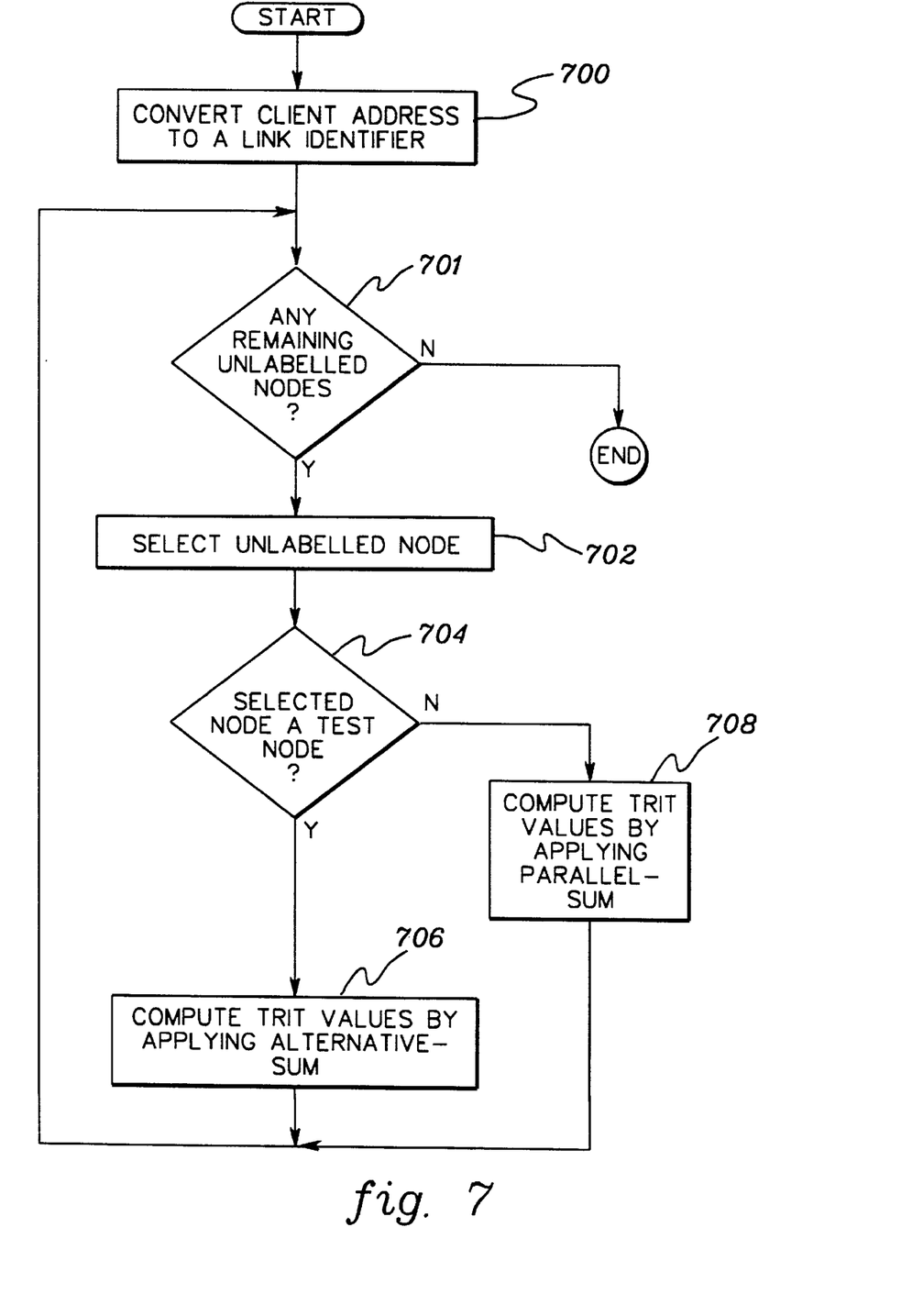
FIG. 7 depicts one embodiment of the logic used to produce the annotated search data structure of FIG. 5, in accordance with the principles of the present invention.

One example of how to generate an annotated search graph for a particular node, such as node 108a, is described below with reference to FIGS. 4, 5 and 7:

1. The terminal nodes of a search graph (e.g., search graph 400 (FIG. 4)) are relabeled in the following manner. For each client address at a given terminal node, the address is converted into a link identifier, STEP 700 (FIG. 7). In particular, the client address is looked-up in the routing table associated with the router and its corresponding link identifier is found. A Yes trit is stored in the vector position corresponding to each such link identifier and a No is stored in all the other vector positions. For example, terminal node 501 of FIG. 5 corresponds to node 401 of FIG. 4. In FIG. 4, the terminal node is labeled with client address 101a, which according to the routing table of FIG. 3, maps to link identifier 3. Thus, the 4-element trit vector associated with node 501 is NNYN, having a Yes in the position corresponding to link 3 and No in every other position.

2. If there is an unlabeled node, STEP 701, then one such node whose out-arcs point only to labeled nodes is chosen, STEP 702 (FIG. 7). (Since the graph is finite, acyclic and fully connected, there is at least one such node.)

a. If the unlabeled node is a test node, INQUIRY 704, then the trit in each position is computed by applying a commutative and associative operation alternative-sum to the trits in the corresponding position of each labeled descendent, STEP 706. An alternative-sum operation is performed as follows: all No values in a particular position yields a No trit; all Yes values yield a Yes trit; and a combination of No and Yes values yield a Maybe trit.

Figure 5:
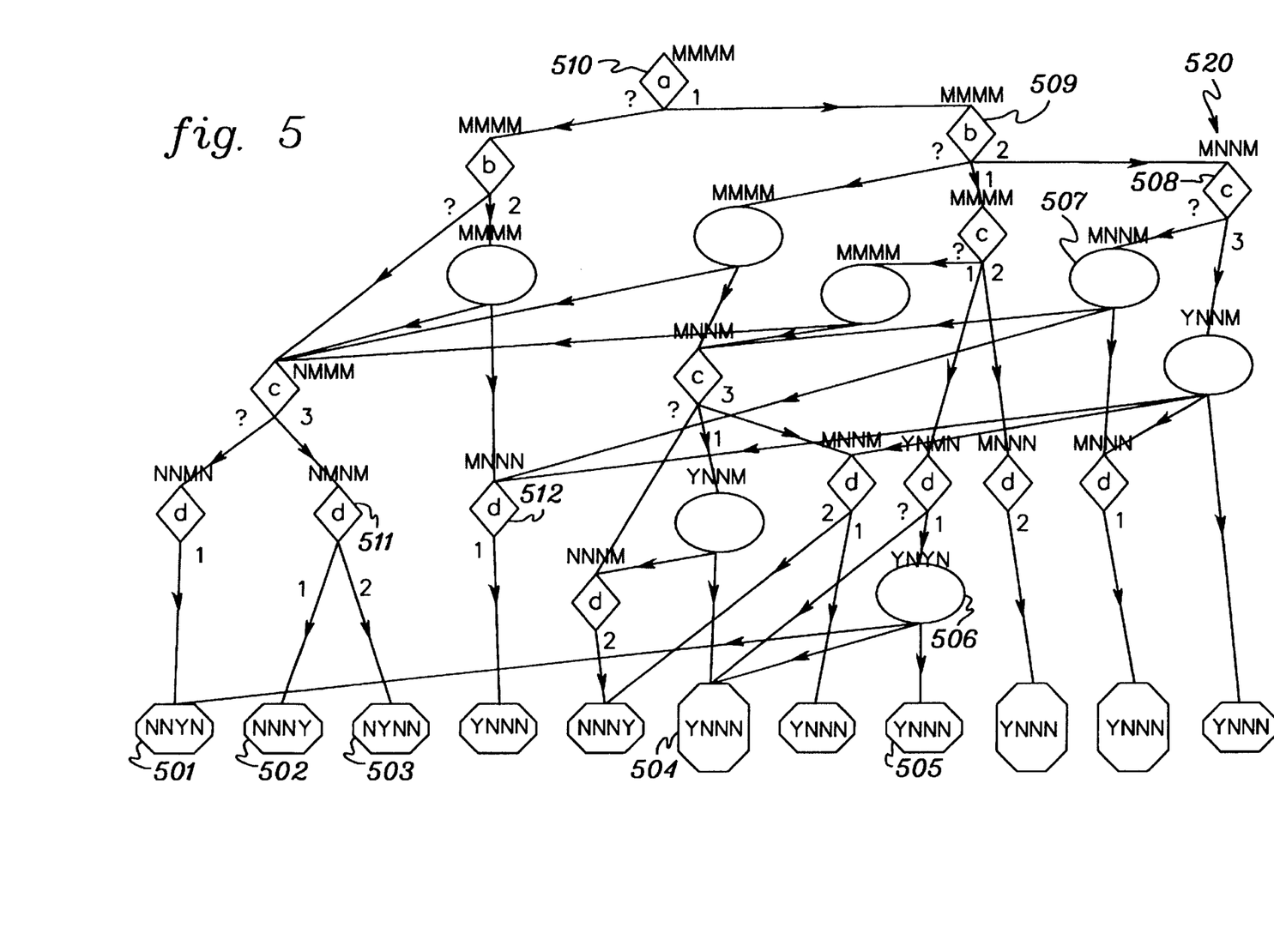
FIG. 5 depicts one embodiment of the search data structure of FIG. 4 annotated in accordance with the principles of the present invention.

For example, in FIG. 5, node 511 is a test node whose out-arcs point to nodes 502 and 503 (and an empty terminal node for the ? test labeled NNNN, which is not shown). Thus, the label of node 511 is computed by applying alternative-sum to NNNY (node 502), NYNN (node 503), and NNNN (empty node), to yield the result NMNM.

b. If the unlabelled node is a parallel search node, INQUIRY 704, then the trit in each position is computed by applying a commutative and associative operation parallel-sum to the trits in the corresponding position of each labeled descendent, STEP 708. With a parallel-sum operation, a Yes for a particular position in any operand yields a Yes for that position; a No in a particular position for all operands yields a No for that position; and a combination of No and Maybe or all Maybe's yields a Maybe.

For example, node 506 in FIG. 5 is a parallel search node whose out-arcs point to nodes 501, 504, and 505. The label of node 506 is computed by applying parallel-sum to NNYN (node 501), YNNN (node 504), and YNNN (node 505), to yield the result YNYN.

3. Step 2 is repeated until all the nodes in the graph are labeled with a trit vector, INQUIRY 701.

In accordance with the principles of the present invention, each router in the network contains an annotated search graph, computed as described above. The annotated search graph is recomputed each time the subscription set changes. When a message is received at the router, the annotated search graph is traversed to determine the links over which the message is to be forwarded. A data structure, called a mask, is used during the search of the graph. The mask is, for example, a d-vector of trits specifying the current knowledge of which network links are to receive the current message: Yes means the corresponding network link will receive the message; No means that it need not receive the message; and Maybe means that further tests are needed to determine whether or not the network link will receive the message.

Figure 8:
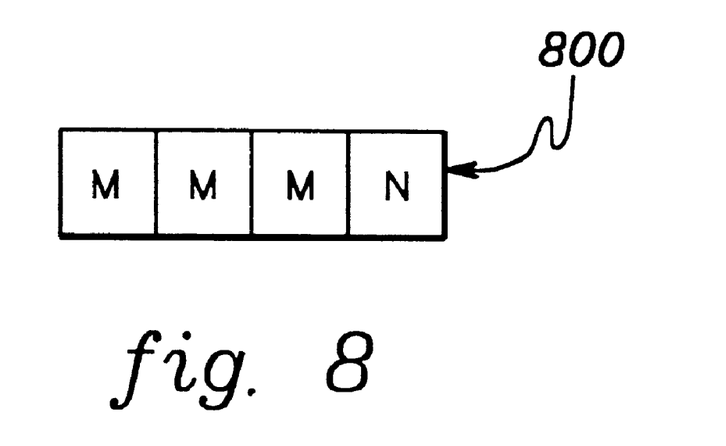
FIG. 8 depicts one example of a mask used when traversing the annotated search data structure of FIG. 5, in accordance with the principles of the present invention.

When a message is received at a router, the mask vector is set to Maybe in each position, except for the position corresponding to the link over which the message was received. In that position, the mask is set to No, since, in this embodiment, no message traverses the same link in two directions. One example of a mask 800 in which the message arrived on link 4 is depicted in FIG. 8.

When a message is received, the annotated search graph is traversed, in order to determine the link or links over which the message is to be forwarded. Traversal of the graph is complete, for instance, when all of the Maybe's are removed from the mask. Once example of how to traverse an annotated search graph is described below with reference to FIGS. 5, 8 and 9.

Figure 9:
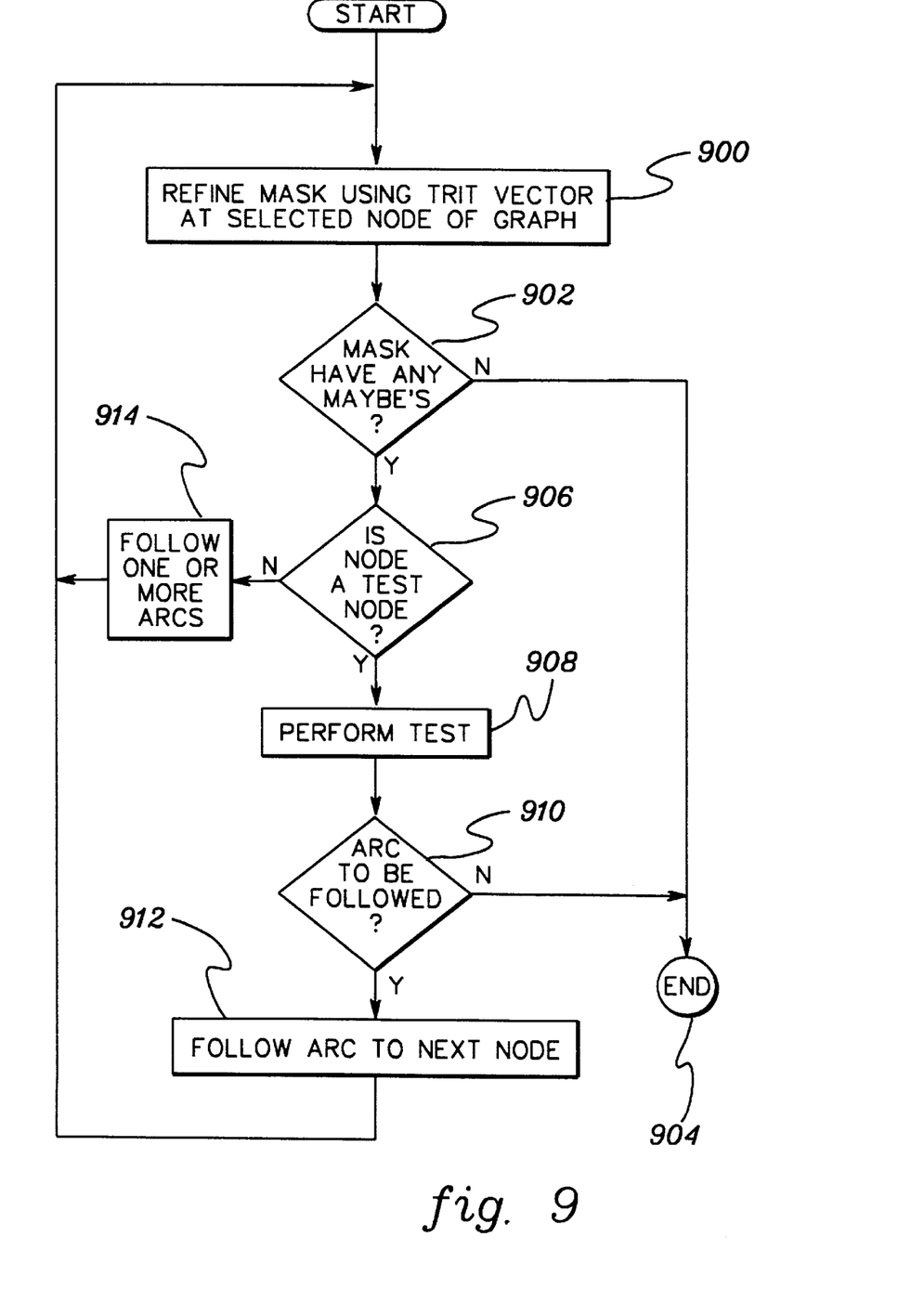
FIG. 9 depicts one embodiment of the logic used to traverse the annotated search data structure of FIG. 5, in accordance with the principles of the present invention.

The search begins at the source node 510 (FIG. 5). Mask trit vector 800 is refined by applying a refine operator using as argument the trit vector at the source node, STEP 900. The mask is changed only if a trit in the mask is Maybe, in which case it is replaced by the corresponding trit from the trit vector at the node. If the refined trit vector in the mask contains no trits labeled Maybe, INQUIRY 902, then the search stops, STEP 904. Otherwise, the search continues, based on the type of the current node.

If the current node is a test node, INQUIRY 906, the test associated with the node label is evaluated to produce a unique outcome, STEP 908. The arc associated with the outcome, if any, INQUIRY 910, is followed to the next node, STEP 912. The mask is then refined with the trit vector of the next node, STEP 900. The next node becomes the current node and the technique repeats. If no arc is associated with the outcome, traversal ends, STEP 904.

If the current node is a parallel search node, INQUIRY 906, then one or more subsearches is begun at the successor nodes of the current node, STEP 914. However, successor nodes that have No at all positions where the mask has Maybe need not be explored. The subsearches may go on serially, or in parallel, at the discretion of the implementation. Each such subsearch uses its own subsearch mask. It begins with the subsearch mask set to the current value of the search mask and proceeds recursively using the technique described with reference to FIG. 9 and ending when the subsearch mask has no Maybe trits. Then, a trit in the search mask is set to a Yes value whenever a subsearch terminates with a subsearch mask having a Yes trit in the corresponding position. A trit in the search mask is set to a No value only when all subsearches terminate with a subsearch mask having a No value in the corresponding position. If the parallel searches are being performed serially, a Yes trit resulting from one branch of a parallel search may be used to refine the mask used on the subsearches on subsequent branches.

Eventually, all the mask positions will be converted from Maybe to either No or Yes, and the search terminates. The message is then sent over each network link whose corresponding mask position contains a Yes.

For instance, suppose in the example of FIG. 5, the message is the set of values a=1, b=2, c=2, and d=1, and is received over network link 4. The mask is initially set to MMMN (Maybe in all positions except the one corresponding to network link 4). The search begins at node 510 of the annotated search graph. Since the trit vector is MMMM, refinement does not change the mask. The test at node 510 causes field a to be tested. Since the value of a is 1, the search continues at test node 509. Since the trit vector at node 509 is MMMM, refinement still does not change the mask. The test at node 509 causes field b to be tested. Since the value of b is 2, the search continues at test node 508. Since the trit vector at test node 508 is MNNM, the mask is refined from MMMN to MNNN. The test at node 508 is performed. Since field c is 2, the arc labeled ? is followed to the parallel search node 507. Since the trit vector is MNNM, the mask remains MNNN. Any of the 3 out-arcs may be searched in the first subsearch. Suppose the arc to node 512 is taken. Since the mask still has a Maybe, field d is tested, and the mask is now refined to YNNN. Since no Maybe's are left in the mask, the search can be interrupted without searching the remaining branches. The message is forwarded only over network link 1.

Described in detail above is a routing capability that avoids the need of placing any routing headers in the message to determine the link(s) over which the message is to be sent, because it combines the steps of matching and routing at each routing node in the network. Simulation studies of large networks and large numbers of subscriptions indicate that the number of predicate tests executed for the average message in its course through the network is less than the number of such tests that would be taken in the conventional approach. Therefore, the invention potentially reduces latency, as well as shortening message headers.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of determining zero or more links to be used in routing a message, said method comprising:

receiving a message; and determining zero or more links over which said message is to be sent, said determining comprising searching a data structure using at least a portion of a data content of said message to determine said zero or more links, wherein said data structure comprises a plurality of tests performable on said at least a portion of said data content, and said searching comprises following one or more paths of said data structure, but less than all paths of said data structure, based upon results of one or more tests of said plurality of tests performed to determine said zero or more links to be used in routing said message.

2. The method of claim 1, wherein said searching comprises traversing said data structure until a mask provides an indication of said zero or more links.

3. The method of claim 2, wherein said mask comprises a plurality of values the positions of which correspond to a plurality of links, and wherein said indication indicates:

zero links when said plurality of values includes a plurality of first predefined values; and one or more links when one or more of said plurality of values includes a second predefined value.

4. The method of claim 3, wherein said plurality of first predefined values includes a plurality of no indications and wherein said second predefined value includes a yes indication.

5. The method of claim 2, wherein said traversing comprises:
   comparing said mask to a vector associated with a node of said data structure;
   refining said mask when said comparing indicates refinement;
   proceeding to another node of said data structure, when said mask is to be further refined; and
   repeating said comparing, refining and proceeding until said mask needs no further refinement.

6. The method of claim 5, wherein said proceeding comprises using said data content to determine the another node.

7. The method of claim 5, wherein said mask comprises a plurality of values the positions of which correspond to a plurality of links of a router that received said message, and wherein said refining comprises updating at least one of said plurality of values in said mask based on at least one value of at least one corresponding position in said vector.

8. The method of claim 7, wherein said updating comprises changing at least one value of the mask from a maybe indication to a yes indication or a no indication, depending on the value in the corresponding position of the vector.

9. The method of claim 5, further comprising annotating a plurality of nodes of said data structure with a plurality of vectors, each of said plurality of vectors indicating at its corresponding node whether any links may be used to reach one or more clients interested in said message.

10. The method of claim 1, wherein said data structure comprises a plurality of subscriptions received from a plurality of clients.

11. The method of claim 1, wherein said receiving and said determining are by a router of a network.

12. A method of routing messages within a network, said method comprising:
   receiving a message; and
   routing said message to a subset of clients of said network, said subset comprising less than all of said clients of said network, wherein said routing is irrespective of any destination information that may be within said message, and wherein said routing comprises searching a data structure using at least a portion of a data content of said message to determine said subset of clients, wherein said data structure comprises a plurality of tests performable on said at least a portion of said data content, and said searching comprises following one or more paths of said data structure, but less than all paths of said data structure, based upon results of one or more tests of said plurality of tests performed to determine said subset of clients to be routed said message.

13. At least one program storage device readable by a machine, tangibly embodying at least one program of instructions executable by the machine to perform a method of determining zero or more links to be used in routing a message, said method comprising:
   receiving a message; and
   determining zero or more links over which said message is to be sent, said determining comprising searching a data structure using at least a portion of a data content of said message to determine said zero or more links, wherein said data structure comprises a plurality of tests performable on said at least a portion of said data content, and said searching comprises following one or more paths of said data structure, but less than all paths of said data structure, based upon results of one or more tests of said plurality of tests performed to determine said zero or more links to be used in routing said message.

14. The at least one program storage device of claim 13, wherein said searching comprises traversing said data structure until a mask provides an indication of said zero or more links.

15. The at least one program storage device of claim 14, wherein said mask comprises a plurality of values the positions of which correspond to a plurality of links, and wherein said indication indicates:
   zero links when said plurality of values includes a plurality of first predefined values; and
   one or more links when one or more of said plurality of values includes a second predefined value.

16. The at least one program storage device of claim 15, wherein said plurality of first predefined values includes a plurality of no indications and wherein said second predefined value includes a yes indication.

17. The at least one program storage device of claim 14, wherein said traversing comprises:
   comparing said mask to a vector associated with a node of said data structure;
   refining said mask when said comparing indicates refinement;
   proceeding to another node of said data structure, when said mask is to be further refined; and
   repeating said comparing, refining and proceeding until said mask needs no further refinement.

18. The at least one program storage device of claim 17, wherein said proceeding comprises using said data content to determine the another node.

19. The at least one program storage device of claim 17, wherein said mask comprises a plurality of values the positions of which correspond to a plurality of links of a router that received said message, and wherein said refining comprises updating at least one of said plurality of values in said mask based on at least one value of at least one corresponding position in said vector.

20. The at least one program storage device of claim 19, wherein said updating comprises changing at least one value of the mask from a maybe indication to a yes indication or a no indication, depending on the value in the corresponding position of the vector.

21. The at least one program storage device of claim 17, wherein said method further comprises annotating a plurality of nodes of said data structure with a plurality of vectors, each of said plurality of vectors indicating at its corresponding node whether any links may be used to reach one or more clients interested in said message.

22. The at least one program storage device of claim 13, wherein said data structure comprises a plurality of subscriptions received from a plurality of clients.

23. At least one program storage device readable by a machine, tangibly embodying at least one program of instructions executable by the machine to perform a method of routing messages within a network, said method comprising:
   receiving a message; and
   routing said message to a subset of clients of said network, said subset comprising less than all of said clients of said network, wherein said routing is irrespective of any destination information that may be within said message, and wherein said routing comprises searching a data structure using at least a portion of a data content of said message to determine said subset of clients, wherein said data structure comprises a plurality of tests performable on said at least a portion of said data content, and said searching comprises following one or more paths of said data structure, but less than all paths of said data structure, based upon results of one or more tests of said plurality of tests performed to determine said subset of clients to be routed said message.

24. An article of manufacture, comprising:

at least one computer usable medium having computer readable program code means embodied therein for causing the determining of zero or more links to be used in routing a message, the computer readable program code means in said article of manufacture comprising:

computer readable program code means for causing a computer to receive a message; and computer readable program code means for causing a computer to determine zero or more links over which said message is to be sent, said computer readable program code means for causing a computer to determine comprising computer readable program code means for causing a computer to search a data structure using at least a portion of a data content of said message to determine said zero or more links, wherein said data structure comprises a plurality of tests performable on said at least a portion of said data content, and said computer readable program code means for causing a computer to search comprises computer readable program code means for causing a computer to follow one or more oaths of said data structure, but less than all paths of said data structure, based upon results of one or more tests of said plurality of tests performed to determine said zero or more links to be used in routing said message.

25. The article of manufacture of claim 24, wherein said computer readable program code means for causing a computer to search comprises computer readable program code means for causing a computer to traverse said data structure until a mask provides an indication of said zero or more links.

26. The article of manufacture of claim 25, wherein said computer readable program code means for causing a computer to traverse comprises:

computer readable program code means for causing a computer to compare said mask to a vector associated with a node of said data structure;

computer readable program code means for causing a computer to refine said mask when said comparing indicates refinement;

computer readable program code means for causing a computer to proceed to another node of said data structure, when said mask is to be further refined; and computer readable program code means for causing a computer to repeat comparing, refining and proceeding until said mask needs no further refinement.

27. The article of manufacture of claim 26, wherein said mask comprises a plurality of values the positions of which correspond to a plurality of links of a router that received said message, and wherein said computer readable program code means for causing a computer to refine comprises computer readable program code means for causing a computer to update at least one of said plurality of values in said mask based on at least one value of at least one corresponding position in said vector.

28. An article of manufacture, comprising:

at least one computer usable medium having computer readable program code means embodied therein for causing the routing of messages within a network, the computer readable program code means in said article of manufacture comprising:

computer readable program code means for causing a computer to receive a message; and computer readable program code means for causing a computer to route said message to a subset of clients of said network, said subset comprising less than all of said clients of said network, wherein routing is irrespective of any destination information that may be within said message, and wherein said computer readable program code means for causing a computer to route comprises computer readable program code means for causing a computer to search a data structure using at least a portion of a data content of said message to determine said subset of clients, wherein said data structure comprises a plurality of tests performable on said at least a portion of said data content, and said computer readable program code means for causing a computer to search comprises computer readable program code means for causing a computer to follow one or more paths of said data structure, but less than all paths of said data structure, based upon results of one or more tests of said plurality of tests performed to determine said subset of clients to be routed said message.

29. A system of determining zero or more links to be used in routing a message, said system comprising:

a router being adapted to receive a message; and said router being further adapted to determine zero or more links over which said message is to be sent, the determining comprising searching a data structure using at least a portion of a data content of said message to determine said zero or more links, wherein said data structure comprises a plurality of tests performable on said at least a portion of said data content, and said searching comprises following one or more paths of said data structure, but less than all paths of said data structure, based upon results of one or more tests of said plurality of tests performed to determine said zero or more links to be used in routing said message.

30. The system of claim 29, wherein said router is further adapted to traverse said data structure until a mask provides an indication of said zero or more links.

31. The system of claim 30, wherein said router is further adapted to:

compare said mask to a vector associated with a node of said data structure;

refine said mask when the comparing indicates refinement;

proceed to another node of said data structure, when said mask is to be further refined; and repeat the comparing, refining and proceeding until said mask needs no further refinement.

32. A system of routing messages within a network, said system comprising:

means for receiving a message; and means for routing said message to a subset of clients of said network, said subset comprising less than all of said clients of said network, wherein said routing is irrespective of any destination information that may be within said message, and wherein said means for routing comprising means for searching a data structure using at least a portion of a data content of said message to determine said zero or more links, wherein said data structure comprises a plurality of tests performable on said at least a portion of said data content, and said searching comprises following one or more paths of said data structure, but less than all paths of said data structure, based upon results of one or more tests of said plurality of tests performed to determine said subset of clients to be routed said message.

* * * * *